J. LYTCH.
CIDER MILL.

No. 109,527.  Patented Nov. 22, 1870.

Witnesses
J. W. H. Johnson
Chas. E. Upperman

James Lytch,
By his Attorneys,
Upperman & Johnson

United States Patent Office.

JAMES LYTCH, OF LAURINBURG, NORTH CAROLINA.

Letters Patent No. 109,527, dated November 22, 1870.

IMPROVEMENT IN CIDER-MILLS.

The Schedule referred to in these Letters Patent and making part of the same.

*To all whom it may concern:*

Be it known that I, JAMES LYTCH, of Laurinburg, in the county of Richmond and State of North Carolina, have invented certain new and useful Improvements in Cider-Mills; and I do hereby declare the following to be a full, clear, and exact description thereof, reference being had to the accompanying drawing of the same which make part of this specification, and in which—

Figure 3:
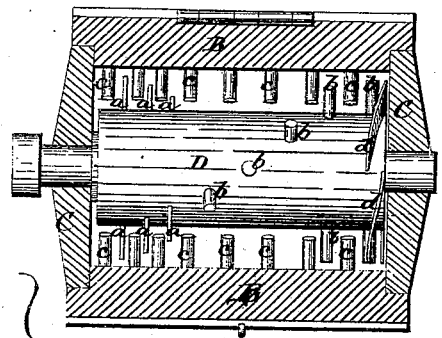

Figure 3, a horizontal section; and

Figure 1:
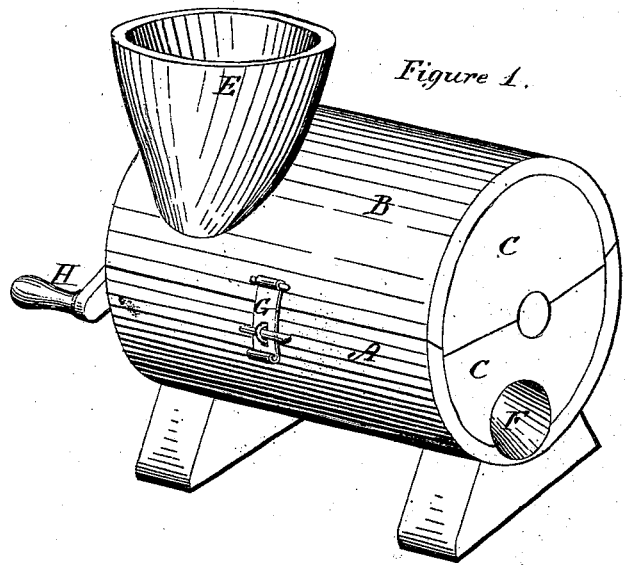
Figure 1 represents a view in perspective of a cider-mill embracing my improvements.
Figure 2:
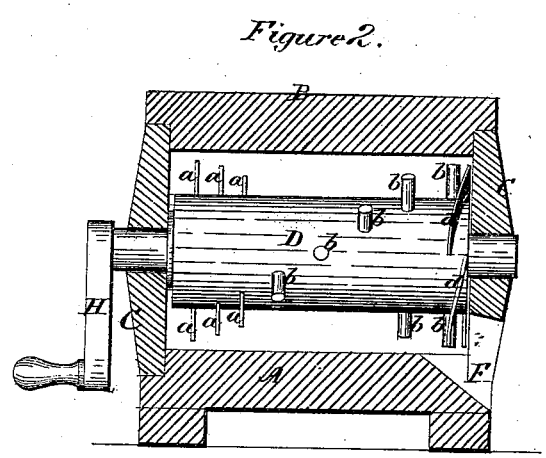
Figure 2 represents a vertical longitudinal section.
Figure 4:
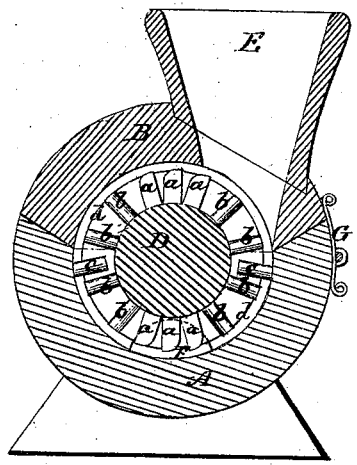

Figure 4, a transverse section of the same.

My improvements relate to cider-mills, for cutting, mellowing, and preparing the apples for the press in such manner as to obtain the greatest amount of cider therefrom, and produce a clear quality of juice, free from the muddy appearance which is common to the cider usually produced by other mills.

In the accompanying drawing—

The mill is represented as a cylinder of wood, bored out, and composed of a fixed and a hinged section, A and B, fitted with heads, C, in the manner of a barrel.

Within the lower fixed section a toothed cylinder, D, is fitted in bearings in the heads, while the upper hinged section supports and carries the hopper E.

The cylinder D is about one-third less in diameter than the interior of its inclosing-case, and is armed with iron cutters, $a$, and cylindrical pins, $b$, which extend therefrom to near the inner circumference of the case, and arranged in two spiral rows from one end of the cylinder to the other, while the inclosing-case is provided with two horizontal rows of cylindrical pins, $c$, projecting from the interior of the case to near the surface of the cylinder. These pins $c$ are placed at an angle of about fifteen degrees, so that the cutters $a$ and pins $b$ of the cylinder will strike them obliquely, thus producing a better effect in cutting and mellowing the apples than if they were horizontal.

The cutters are secured on that end of the cylinder immediately below the hopper, and serve only to cut the apples into pieces, while the pins serve to squeeze and mellow them as they are brought into contact and forced between the fixed pins, while oblique wings, $d$, on the opposite end of the cylinder, catch and discharge them through an opening, F.

To accomplish this, therefore, the pins $b$ are not placed close enough together to reduce the pieces of apple to a pulp, but suitable spaces are left between them to allow the pieces to be pressed and squeezed against them so as not to grate them, but to deliver them to the press in a mellow condition, thus causing them to retain their juice to be extracted by the press, whereby I am enabled to produce a clearer juice than if the apples were delivered to the press in a grated, pulpy condition.

In order that the apples may be delivered directly upon the fixed pins $c$ at the side of the cylinder D, the hopper E is arranged at one side of the hinged cover B, directly above one of the said fixed rows of pins, so that the apples may descend through the hopper and rest upon said pins in a position to receive the action of the knives $a$, instead of being delivered directly upon the cylinder; and I have found this arrangement of the hopper to be very advantageous, in preventing the liability of the apples to choke therein, as they are thus presented to the action of the knives at the side of the cylinder.

The apples, thus cut into pieces and rendered soft and juicy, are worked to the opposite end of the cylinder by the spiral form of the pins thereon, and forced, by the oblique wings $d$ on the end of the cylinder, through an opening, F, in its opposite end, and delivered by a chute into a press of any suitable construction.

The hinged section B is provided with a clasp, G, by which it is secured to the base A of the case, and the cylinder is provided with a crank-handle, H, by which it is turned.

The mill thus constructed may be mounted in any suitable frame-work, and being made entirely of wood, except the cutters, cannot rust or corrode.

Having described my invention,

I claim—

The combination of the hopper E located at the side of the hinged section B, and the cylinder D, with the case A, oblique rows of pins $c$, cylinder D, spiral rows of cutters $a$, pins $b$, and discharging-wings $d$, the whole arranged and operating as described.

JAMES LYTCH.

Witnesses:
T. H. UPPERMAN,
T. S. GENIN.